UNITED STATES PATENT OFFICE 2,627,479

SYNTHETIC DRYING OIL AND METHOD OF MAKING SAME

Lee Pritzker, Baltimore, Md.

No Drawing. Application May 5, 1947,
Serial No. 746,161

20 Claims. (Cl. 106—265)

This invention relates to synthetic drying oils, to methods of making such oils, to coating compositions containing such oils, and their methods of manufacture, and the utilization of such drying oils for various purposes.

Petroleum derived resins or resins produced from petroleum constituents have been prepared and suggested for a variety of uses, but some of these materials as available are quite brittle and hard and unsatisfactory for use as such in the usual way in which resins are employed in producing coating compositions. On the other hand, some of the unsaturated petroleum derived polymers in liquid form, are not satisfactory for use as drying oils in the normal way.

Among the objects of the present invention is the production of synthetic drying oils from petroleum derived resins and liquid unsaturated polymers capable of utilization as drying oils in the production of satisfactory coatings by normal procedures, and for a variety of other purposes.

Other and further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, a synthetic drying oil of wide utility is produced by producing a heat reaction product of a petroleum derived resin which of itself does not oxidize or dry readily with a petroleum derived liquid unsaturated polymer resulting in the production of a synthetic material having all of the desirable properties of drying oils in their conventional usage.

The petroleum derived resin employed may be characterized as a tough, rubber-like, resilient resin of petroleum long chain unsaturated hydrocarbons produced by air blowing of the propane precipitated viscous material from propane dewaxed straight cylinder stock of paraffin base petroleum origin. Or such resins may be described as products produced by taking a straight cylinder stock, that is, one produced by distillation without substantial heat decomposition, from paraffin base petroleums such as Eastern petroleums containing extremely low asphaltic materials or considered substantially as asphalt-free. A cylinder stock is produced from such paraffin base petroleum by any of the usual methods to give a cylinder oil. Such cylinder stock oil is then subjected to a dewaxing operation by the use of hydrocarbons from ethane to butane, more particularly exemplified by propane which is quite commonly used in dewaxing operations, the treatment being carried out in the usual way at temperatures below about —20° F., the wax being removed and leaving the propane oil fraction. Ordinarily such dewaxing operations are carried out at the indicated temperatures, using approximately 3 parts of solvent to 1 part of oil undergoing treatment, but of course, other ratios may be employed as well as any temperature which enables the dewaxing operation to be carried out, propane dewaxing being particularly referred to as exemplary. Following such dewaxing operation, additional hydrocarbon more particularly propane, is added to increase the amount of propane present to a point where precipitation of high molecular weight hydrocarbons of viscous character naturally occurring in the cylinder oil are precipitated. Propane ratios at this point may be for example, from about 8 of propane to 1 of oil. Such operations are usually carried out about 77° F. and may be at any temperature above that below the critical temperature of the solvent employed. The result is a hydrocarbon viscous material precipitated by propane from the propane dewaxed cylinder stock. This viscous material is then subjected to air blowing at temperatures for example, of from 450 to 575° F. for a length of time sufficient to produce a viscosity and other characteristics in the product as desired, which time may vary from a few to 20 hours and upward at the temperatures indicated. The resulting treatment yields a tough, rubber-like, resilient resin of petroleum long chain hydrocarbons having some unsaturation which may run from about one double bond to 44 to 52 of carbon atoms present. Such materials are particularly valuable for utilization in the present invention and may be produced in various grades having softening points for example, running from 120 to 140° F. up to 300 to 320° F. and corresponding penetrations (measured by the usual conventional standards) running from approximately 163 down to 42 respectively.

Such viscous material may desirably be employed in accordance with the present invention directly without further treatment but if desired, may be further subject to a phenol extraction to increase its viscosity and decrease its A. P. I. gravity, the phenol extracting certain constituents from the air blown material having desirable properties for utilization in accordance with the present invention. The phenol extraction may be carried out at any desirable temperature, as for example, from 100 to 200° F. either under anhydrous conditions or in the presence of a small amount of water. Such phenol type extractions are well known in the art as applied to other materials and are utilized herein for purposes of removing certain constituents from the air blown viscous material referred to above. The product at this stage may be referred to as produced by phenol extraction of the air blown product referred to above and may have characteristics as to softening point penetration, etc. still within the scope of that set forth above for the viscous material but any given product will be modified along lines indicated by such phenol extraction. As exemplary of a material of specific characteristics that may be utilized in accordance with the present invention, the following is given:

| | |
|---|---|
| Softening point (R & B) A. S. T. M.: E28-42T, °F | 250 |
| Needle penetration A. S. T. M., D5-25: | |
| 100 gms., 5 secs., 32° F | 20 |
| 200 gms., 60 secs., 32° F | 45 |
| 100 gms., 5 secs., 77° F | 50 |
| 100 gms., 5 secs., 115° F | 95 |
| 50 gms., 5 secs., 115° F | 65 |
| Solubility in 88° Baumé petroleum naphtha _____ per cent | 99.8 |
| Neutralization or acid number (Mg.KOH/gm.) | 0.1 |
| Flash (C. O. C.) °F | 625 |
| Specific gravity | 0.9659 |

As exemplifying the types of products which come within the scope of the resins defined above that may be utilized in accordance with the present invention attention may be called to Patent No. 2,337,336 to McCluer et al., where their product is defined as a chemical condensation product derived from a naturally contained high molecular weight viscous material precipitated from a warm propane solution of a residual paraffin base oil fraction which has undergone no thermal decomposition or chemical change beyond that induced by ordinary fractional distillation, said chemical condensation product having an iodine number not substantially above 40, a ball and ring softening point above 110° F., an average molecular weight of at least 1900, at least 40 carbon atoms per double bond, and a marked reduction in susceptibility to penetration with temperature change in the range of from 30 to 60° F., and being substantially completely soluble in 88° Baumé naphtha. While such products as those defined in that patent are particularly useful in connection with the present invention, the petroleum derived resin as defined above is not to be construed as limited to the McCluer et al. product, the latter merely being exemplary of the products employed in accordance with the present invention.

Generally these resins are soluble in various non-polar solvents, as for example, mineral spirits, kerosene, naphtha, and other petroleum distillate solvents, and aromatic or chlorinated solvents, such as benzene, toluene, trichlor ethylene, carbon tetrachloride, etc. The resins are particularly valuable for use in coating compositions because of their ready solubility in low cost solvents as indicated, and also because of the properties of the resulting coatings based on such resins. They do not vary substantially in viscosity over wide temperature ranges, they do not become hard and brittle at temperatures as low as −60° C. and in many instances will not soften and run at temperatures as high as 200 to 300° F. They do not oxidize or harden in any undesirable way, and may be utilized, therefore, in connection with various types of coating compositions.

Such petroleum derived resin as that referred to above lacks drying and oxidation characteristics and may be converted into a desirable synthetic drying oil by heat reaction with a petroleum derived polymer. This petroleum derived polymer is produced as a by-product in cracking of petroleum tars and may be defined as a heat reactive, aromatic type olefinic hydrocarbon resin that is entirely a petroleum product. It is highly unsaturated and dries by both oxidation and polymerization. Its physical properties may be characterized as follows:

| | |
|---|---|
| Specific gravity, 60°/60° F | 1.0–1.02. |
| Viscosity, S. U. S. at 210° F | 100–300. |
| Flash, Cleveland Open Cup | 200° F. min. |
| Iodine number (Wijs) | 160–200. |
| Non-volatile | 85% min. |
| Color | Dark. |

It has been found by heating the petroleum defined resin as set forth above with the petroleum derived liquid polymer as described above, reaction takes place in the production of a synthetic drying oil of very desirable characteristics usable for a variety of purposes for which drying oils of natural character may be employed. The heat treatment should be carried out at temperatures at which reaction between the stated constituents is obtained. Such temperatures will necessarily vary with the particular character of the resin and liquid polymer employed, but will generally be at elevated temperatures running from 350° F. to 600° F., particularly at temperatures of about 450° F. and higher. That temperature is a particularly desirable one in producing the heat reaction product in accordance with the present invention. The time of heat treatment to produce the reaction product varies but will usually be in the order of 1 or more hours from 1½ hours upward being generally employed. The combination by heat reaction of the stated ingredients gives a product which yields a better film in coating compositions and due to the unsaturation present, enables combinations of that reaction product to be employed with unsaturated oils as will be more particularly set forth below.

The reaction product as set forth above results from a breaking of the gel and a definite reaction product is obtained. This may be thinned with ordinary paint thinners, as for example, any of the thinners set forth above such as mineral spirits in various dilutions, as for example, to a 50% solution to give an oil which retains the elastic properties of the petroleum derived resin but has new properties similar to a drying oil because of the combination with the unsaturated petroleum derived polymer.

The proportions of resin to polymer employed may vary substantially, the resin generally being the major constituent of the combination. Enough unsaturated polymer should be employed to give the requisite properties as set forth above to the heat reaction products. The more desirable ranges of unsaturated polymer to resin as these ingredients are defined above will run in the ratio of about 1 of polymer to 3 of resin to 5 of polymer to 12 of resin. These represent the most desirable ranges to be employed, and other proportions may be utilized although the particular ratios set forth above give very valuable products.

While the synthetic oil produced by the combination of the stated resins and polymers by heat reaction are particularly valuable and may be utilized for many purposes, they have the characteristic staining properties of these types of materials. The staining characteristics of such materials may be substantially reduced by carrying out the reaction of the petroleum derived resin with the unsaturated polymer in the presence of a chlorinated derivative, particularly solid chlorinated derivatives such as the solid chlorinated hydrocarbons, as for example, chlorinated paraffin. Thus a chlorinated paraffin wax containing 70% chlorine is particularly useful but other chlorinated paraffins may be employed. One such product containing 70% of chlorine has a melting point (ball and ring method) of 90–100° C., a specific gravity of about 1.62–1.70, a density of about 7.45, molecular weight approximately 1060, refractive index 1.5347, insoluble in water but soluble to an extent of at least 50% in such solvents as acetone, amyl acetate, carbon tetrachloride, China-wood oil, dioxane, ethyl acetate, ethylene dichloride, linseed oil, methyl ethyl ketone, mineral spirits, monochlorobenzene, orthodichlorobenzene, perchloroethylene, perilla oil, Solvesso 100, soya bean oil, toluol, turpentine and xylol, while it is substantially insoluble in alcoholic solvents like normal butanol, ethanol, glycerine, isopropanol, and methanol. Although combinations of such non-solvents may be utilized with the solvents in combination to produce solubility.

Such chlorinated materials, as for example, the chlorinated paraffin derivative referred to above may be reacted into the complex by first producing the synthetic oil as set forth above and then reacting such synthetic oil with the chlorinated derivative at temperatures of the ranges indicated above in producing the synthetic oil, or more desirably the chlorinated derivative such as the chlorinated paraffin, may be present at the time that the synthetic oil is being produced from the petroleum derived resin and petroleum derived unsaturated liquid polymer so that the reaction product resulting contains the chlorinated derivative such as the chlorinated paraffin in reaction in the resulting reaction product. Here again the temperatures employed may be of the order as that set forth above in producing the synthetic oil, as for example, temperatures of elevated character as indicated above, and particularly around 450° F. for an exemplary type of product. The resulting reaction product yields an oil of desirable characteristics employable as a synthetic drying oil in lieu of drying oils for their usual purposes, but which possesses much less staining properties than the synthetic drying oil referred to above produced without the chlorinated derivative.

The amount of chlorinated derivative such as chlorinated wax set forth above employed may vary substantially but sufficient should be present to give substantially non-staining properties to the resulting reaction product. For preferred purposes the chlorinated paraffin as indicated above may be utilized in a ratio of from 1 to 2 with the amount of unsaturated polymer employed in producing the reaction, to 1 to 3 of chlorinated paraffin as described above to polymer.

As has been indicated above, the synthetic oil produced in accordance with the present invention whether the reaction product obtained in the absence of the chlorinated paraffin or in its presence, possesses substantial drying properties due to the presence of unsaturated groups or bonds. Consequently such synthetic drying oil may desirably be combined in a reaction product with drying oils of unsaturated character, particularly those of conjugated unsaturation or containing triple bonds as in oiticica and wood oils. The latter stated oils with unsaturated conjugation are particularly valuable in giving heat reaction products with the synthetic drying oil. For example, the synthetic drying oil may be produced and reacted with a drying oil such as oiticica or wood oil at temperatures in the same range as that utilized for producing the synthetic drying oil, or more desirably the stated drying oils such as oiticica and wood oils may be added to the reacting ingredients and the reaction to produce the synthetic drying oil carried out simultaneously in the presence of the drying oils such as oiticica or wood oil to produce a complex reaction product. The resulting product is a good drying, durable drying oil of very valuable properties for coating and other purposes. The most desirable product is that obtained by the simultaneous heat treatment of all of the stated ingredients including the petroleum derived resin, the petroleum derived unsaturated liquid polymer, the chlorinated paraffin, and the drying oil particularly those with conjugated unsaturation, heat treated at elevated temperatures, as for example, 450° F.

The amount of drying oil employed in producing the reaction product may be equal to the amount of chlorinated paraffin employed, or when the latter is not present, may be in the same ratios to polymer as that set forth above for the chlorinated wax.

The resulting good drying, durable synthetic oil produced may be utilized in solvents of the character employed for coating compositions and for example, may be dissolved in solvents of the character set forth above, either used alone or in combination as exemplified by mineral spirits. Such compositions may be utilized in solution in solvents such as mineral spirits as liquids for coating compositions, impregnation, etc., and may themselves be an article of commerce. Driers may be incorporated into such combinations together with pigments in the usual manner to produce very desirable coating compositions.

I

As an example of producing a particular synthetic drying oil in accordance with the present invention, a petroleum derived resin as defined above was employed with a petroleum derived unsaturated liquid polymer as set forth above, and other stated ingredients in the following proportions:

| | |
|---|---|
| Resin | 1225 |
| Polymer | 350 |
| Chlorinated paraffin | 175 |
| China-wood oil | 175 |

The stated ingredients may be combined in any desirable way as referred to above but in this particular example the ingredients were all heated together to a temperature of about 450° F. for 1½ hours. When cold the resulting product was incorporated with 1750 parts by weight of mineral spirits, the parts given above also being parts by weight. Into such resulting solution there may be incorporated driers such as 6% manganese naphthenates and 24% of lead driers to produce the product which may be then incorporated with pigments as desired. The synthetic drying oil produced in this example before incorporation of driers and pigments may be characterized as a synthetic drying oil of fairly heavy body with drying characteristics. Its viscosity may be changed as desired by the addition of diluents, particularly ketone solvents such as diacetone alcohol, ethyl methyl ketone, etc., to get any viscosity desired.

Another example of producing a synthetic drying oil in accordance with the present invention is as follows:

II

| | |
|---|---|
| Resin | 1225 |
| Polymer | 550 |
| Alkali refined fish oil | 175 |
| Varnish maker's linseed oil | 175 |

The following procedure may be utilized in combining these ingredients. Heat the resin and oil to 450° F. and hold until all is melted, then add the polymer and raise the heat to 580° F., stirring vigorously to whip down any foam produced. It is held at 500 to 600° F. for from 60 to 90 minutes to complete the reaction and then cooled to 450° F. where it is thinned to 55% solids, as for example, with mineral spirits.

III

| | |
|---|---|
| Resin | 1225 |
| Polymer | 450 |
| Alkali refined fish oil | 200 |
| Chlorinated paraffin | 150 |

The components may be incorporated as follows. Heat the resin and oil to 480° F., add the polymer, and raise the temperature to 540° F. and hold it at that temperature for 40 minutes. Then cool to 450° F., add the chlorinated paraffin, and hold at that temperature for 30 minutes. It may then be thinned to 55% solids with, for example, a mixture of 85% mineral spirits and 15% diacetone alcohol (percentages by volume).

The synthetic drying oils produced in accordance with the present invention may be utilized in the production of coatings of various types including paints, enamels, graphite paints, roofing paints, tin paints, barn paints, zinc chromate primers, etc. The coatings exhibit very desirable characteristics, namely, low cost, high gloss and outstanding durability in surface coatings even when employed with substantial quantities of such pigments as roofing pigments, namely, red, green, etc., commonly employed, for example, Venetian red. Other types of pigments, of course, may be included, for example, aluminum pastes and powders, etc.

Such pigmented coatings when properly formulated, give products far superior to ordinary roof and barn paints ordinarily available in the low cost field, and actually exhibit durability and other characteristics fully equal to high grade coatings of the more expensive type. Roof and barn paints in the low cost field prepared from pigments, extenders for pigments, rosin-varnish (gloss oil), blown or bodied vegetable or animal oils, mineral spirits, and usually from 5 to 15% of water give coatings which tested in the weatherometer have a durability factor of about 15 to 60 hours. At that time the film shows visible signs of breakdown such as cracking, fading, and film disintegration. Analogous products of higher grade using linseed oil and spar varnish, exhibit a durability factor of from 100 to 300 hours before visible film failures are observed. The coatings produced with the synthetic drying oils of the present invention in comparative standard tests with the low cost roof and barn paints as set forth above, show outstanding durability for the compositions prepared in accordance with the present invention as compared with such roof and barn paints heretofore available in the art and actually equal or better in all respects with the higher cost linseed oil and spar varnish coatings referred to above. There is an additional factor involved with the latter, particularly the linseed oil paints. Oxidation has a marked effect on linseed oil paints during weathering, and when breakdown starts, acidic bodies are formed. Compositions produced on the other hand in accordance with the present invention do not exhibit that type of breakdown or formation of acidic bodies.

To exemplify pigmented coatings, paints, etc., the following examples are given.

IV

*Roof and barn paint.*—In this and subsequent examples, all parts are in pounds unless otherwise indicated.

| | |
|---|---|
| Venetian red | 576 |
| Asbestine | 100 |
| Aluminum stearate | 2 |
| Vehicle of Example I above | 1050 |
| Diacetone alcohol | 50 |
| 6% manganese drier | 40 |
| 5% calcium drier | 18 |

This paint exhibits good brushing qualities, dries in 18 hours to a smooth, high gloss finish, with a high degree of water resistance, and a durability factor far superior to ordinary types of similar products containing rosin-oil compositions.

V

*Green trim and trellis paint.*—This type of paint utilized for all kinds of wood trim, shutters, etc., may be compounded as follows:

| | |
|---|---|
| Medium chrome green | 308 |
| China clay | 65 |
| Vehicle of Example II | 1102 |
| Hydrogenated naphtha | 104 |
| Japan drier | 55 |

This paint gives a coating which dried to a high, enamel-gloss, showing very good color retention, and outstanding durability.

VI

*Black graphite paint*

| | |
|---|---|
| Graphite | 100 |
| Barytes | 20 |
| Vehicle of Example III | 720 |
| Butyl Cellosolve | 42 |
| Driers | 30 |

This composition is particularly useful as a protective coating on metal work, such as heat pipes, and other surfaces which may become hot at various times in the utilization of the articles having such surfaces and exhibit excellent properties for all such surfaces even at temperatures up to 350° F. They also show outstanding water impermeability.

VII

*Zinc chromate primer.*—As exemplary of primer types of compositions, the following is noted.

| | |
|---|---|
| Red lead | 100 |
| Zinc chromate | 300 |
| Chrome yellow | 60 |
| Asbestine | 60 |
| Vehicle of Example I | 610 |
| Diacetone alcohol | 80 |
| Driers | 36 |

This primer composition dries to a low satin finish, has good adhesion to metal, and is ideal as a rust inhibitive primer on metal surfaces.

VIII

*Aluminum paint.*—As a ready mix aluminum paint the following is given:

| | |
|---|---|
| Aluminum powder or paste | 200 |
| Vehicle of Example III | 730 |
| Thinners and driers | 20 |

The resulting paint composition gives a fine leafing material ideal on various surfaces including surfaces carrying bituminous such as asphalt coatings.

IX

As exemplary of a paint the following is given for preparation of a dark gray house paint:

| | |
|---|---|
| Lead carbonate | 300 |
| 35% leaded zinc | 300 |
| Asbestine | 60 |
| Barytes | 200 |
| Titanium oxide | 140 |
| Vehicle of Example II | 660 |
| Thinners and driers | 56 |

Having thus set forth my invention, I claim:

1. As a synthetic drying oil, the heat reaction product resulting from the method of claim 12 of a tough, rubber-like, resilient, resin of petroleum long-chain unsaturated hydrocarbons produced by air blowing at 450 to 575° F. of the propane precipitated viscous material from propane dewaxed straight cylinder stock of paraffin base petroleum origin and a petroleum derived unsaturated liquid polymer obtained as a by-product in the cracking of petroleum tars in the form of a heat-reactive, aromatic-type olefinic hydrocarbon having a specific gravity 1.0–1.02, viscosity S. U. S. at 210° F. of 100–300, flash point 200° F. minimum, iodine number (Wijs) of 190–200, the resin being the major constituent of the combination with the polymer, the amount of polymer being sufficient to give drying characteristics to the heat reaction product of resin and polymer.

2. The synthetic drying oil as set forth in claim 1, in which the resin is phenol extracted.

3. The synthetic drying oil of claim 1 including a solid chlorinated hydrocarbon in amount of not more than one-half by weight of the amount of polymer.

4. The synthetic drying oil of claim 2 including a solid chlorinated hydrocarbon in amount of not more than one-half by weight of the amount of polymer.

5. The synthetic drying oil of claim 1 including chlorinated paraffin in amount of not more than one-half by weight of the amount of polymer.

6. The synthetic drying oil of claim 2 including chlorinated paraffin in amount of not more than one-half by weight of the amount of polymer.

7. The synthetic drying oil of claim 1 including a drying oil containing a triply conjugated double bond in amount of not more than one-half by weight of the amount of polymer.

8. The synthetic drying oil of claim 2 including a vegetable drying oil having a triply conjugated double bond in amount of not more than one-half by weight of the amount of polymer.

9. The synthetic drying oil of claim 3 including a natural drying oil in amount of not more than one-half by weight of the amount of polymer.

10. The synthetic drying oil of claim 6 including a natural drying oil in amount of not more than one-half by weight of the amount of polymer.

11. A drying oil as set forth in claim 1, thinned with mineral spirits and containing driers.

12. The method of making a synthetic drying oil which comprises heating for at least one hour to reaction temperature of about 350 to 600° F. a tough, rubber-like, resilient, resin of petroleum long-chain unsaturated hydrocarbons produced by air blowing at 450 to 575° F. of the propane precipitated viscous material from propane dewaxed straight cylinder stock of paraffin base petroleum origin with a petroleum derived unsaturated liquid polymer obtained as a by-product in the cracking of petroleum tars in the form of a heat-reactive, aromatic-type olefinic hydrocarbon having a specific gravity 1.0–1.02, viscosity S. U. S. at 210° F. of 100–300, flash point 200° F. minimum, iodine number (Wijs) of 190–200 the resin being the major constituent of the combination with the polymer, the amount of polymer being sufficient to give drying characteristics to the heat reaction product of resin and polymer.

13. The method as set forth in claim 12 in which the reaction is carried out in the presence of a solid chlorinated hydrocarbon in amount of not more than one-half by weight of the amount of polymer.

14. The method as set forth in claim 12 carried out in the presence of a drying oil in amount of not more than one-half by weight of the amount of polymer.

15. The method as set forth in claim 12 carried out in the presence of a drying oil having conjugated unsaturation in amount of not more than one-half by weight of the amount of polymer.

16. As a synthetic drying oil, the reaction product obtained by heating for at least one hour to reaction temperature of about 350 to 600° F. a tough, rubber-like, resilient, resin of petroleum long-chain unsaturated hydrocarbons produced by air-blowing at 450 to 575° F. of the propane precipitated viscous material from propane dewaxed straight cylinder stock of paraffin base petroleum origin with a petroleum derived unsaturated liquid polymer obtained as a byproduct in the cracking of petroleum tars in the form of a heat-reactive, aromatic-type olefinic, hydrocarbon having a specific gravity 1.0–1.02, viscosity S. U. S. at 210° F. of 100–300, flash point 200° F. minimum, iodine number (Wys) of 190–200, in which the ratio of resin to polymer is from 3:1 to 12:5.

17. The drying oil of claim 16 including a solid chlorinated hydrocarbon in amount of not more than one-half by weight of the amount of polymer.

18. The drying oil of claim 16 including a solid chlorinated hydrocarbon in amount of not more than one-half by weight of the amount of polymer and an equal amount of a natural drying oil.

19. The method of making a synthetic drying oil which comprises heating for at least one hour to reaction temperature of about 350 to 600° F. a tough, rubber-like, resilient, resin of petroleum long-chain unsaturated hydrocarbons produced by air blowing at 450 to 575° F. of the propane precipitated viscous material from propane dewaxed straight cylinder stock of paraffin base petroleum origin with a petroleum derived unsaturated liquid polymer obtained as a by product in the cracking of petroleum tars in form of a heat-reactive, aromatic-type olefinic hydrocarbon having a specific gravity 1.0–1.02, viscosity S. U. S. at 210° F. of 100–300, flash point 200° F. minimum, iodine number (Wijs) of 190–200, in which the ratio of resin to polymer is from 3:1 to 12:5.

20. The method of claim 19 in which the reaction is carried out in the presence of a solid chlorinated hydrocarbon in an amount of not more than one-half by weight of the amount of polymer.

LEE PRITZKER.

No references cited.